United States Patent
Watanabe

(10) Patent No.: US 7,269,779 B2
(45) Date of Patent: Sep. 11, 2007

(54) DATA REPRODUCING METHOD AND DATA REPRODUCING APPARATUS

(75) Inventor: Yasuyuki Watanabe, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 423 days.

(21) Appl. No.: 10/366,525

(22) Filed: Feb. 14, 2003

(65) Prior Publication Data

US 2004/0030981 A1 Feb. 12, 2004

(30) Foreign Application Priority Data

Aug. 9, 2002 (JP) ............................. 2002-233713

(51) Int. Cl.
*G11C 29/00* (2006.01)

(52) U.S. Cl. ...................... 714/764; 714/769

(58) Field of Classification Search ...................... None
See application file for complete search history.

(56) References Cited

U.S. PATENT DOCUMENTS 5,604,646 A * 2/1997 Yamawaki .................... 360/53
5,844,920 A * 12/1998 Zook et al. .................. 714/769
6,530,037 B2 * 3/2003 Ando et al. .................... 714/8

FOREIGN PATENT DOCUMENTS

| JP | 1-124158 | 5/1989 |
|---|---|---|
| JP | 07-296517 | 11/1995 |
| JP | 2002-73285 | 3/2002 |

OTHER PUBLICATIONS

Wicker, Stephen B. Error Control Systems for Digital Communication and Storage. Upper Saddle River: Prentice-Hall, 1995. pp. 229-233.*
Office Action dated Feb. 20, 2007 in corresponding Japanese patent application JP 2002-233713.
Appendix A - "Prior Art Information List" 1995.
Japanese Patent Office Action, Mailed May 29, 2007 and issued in corresponding Japanese Patent Application No.: 2002-233713.

* cited by examiner

*Primary Examiner*—Guy Lamarre
*Assistant Examiner*—Steve Nguyen
(74) *Attorney, Agent, or Firm*—Staas & Halsey LLP

(57) ABSTRACT

A method of reproducing data by performing error correction on data read from a recording medium. The method includes reading a sync pattern, checking if the sync pattern has been read, recovering data following the sync pattern when the sync pattern has not been read, and performing the error correction on the recovered data. The data following the sync pattern is recovered in the error correction, which makes it easier to lengthen the time width of a detection window setting signal for detecting the sync pattern.

2 Claims, 4 Drawing Sheets

DATA REPRODUCING METHOD AND DATA REPRODUCING APPARATUS

CROSS-REFERENCE TO RELATED APPLICATIONS

This application is based upon and claims the benefit of priority from the prior Japanese Patent Application No. 2002-233713, filed on Aug. 9, 2002, the entire contents of which are incorporated herein by reference.

BACKGROUND OF THE INVENTION

The present invention relates to a data reproducing apparatus, and, more particularly, to a data reproducing apparatus which reproduces data recorded on a recording medium, such as an optical disk or magnetic disk.

As shown in FIG. 1, data is recorded on an optical disk in units of sectors each comprising an ID section 1 and a data section 2. The data section 2 includes sync patterns SB1 to SB3, a plurality of resync patterns RS1 to RS39, a user data section 3, an error checking or cyclic redundancy check (CRC) code storage section (not shown) and an error correcting code (ECC) storage section 4.

In case of reading data from an optical disk, the ID section 1 is read prior to reading of the data section 2 and the address of the sector is checked based on data in the ID section 1, then reading of the data section 2 is started. When the sync patterns SB1 to SB3 and the resync patterns RS1 to RS39 are read, data in the user data section 3, the error checking code and error correcting code are read synchronously using those marks and are stored in a buffer memory.

When reading one sector of data is finished, error correction is performed on the sector data using the error checking code and error correcting code and read data is reproduced. The reproduced data is stored again in the buffer memory. The reproduced data stored in the buffer memory is output via a host interface.

The sync patterns SB1 to SB3 and the resync patterns RS1 to RS39 can be detected when detection window setting signals ws1 and ws2 are set to high (H) levels in their respective time widths Tw1 and Tw2.

In a case where the sync patterns SB1 to SB3 could not be detected in the H-level period of the detection window setting signal ws1, data D1 to D15 recorded between the sync patterns SB1 to SB3 and the resync pattern RS1 cannot be read. In this case, a sync miss detection signal SMS is set to an H level and dummy data of "00h" is stored in the buffer memory in place of the unreadable data D1 to D15 before the detection window setting signal ws2 is set to an H level.

Next, when the resync pattern RS1 is read in the H level period of the detection window setting signal ws2, a resync pattern detection signal RSS is generated. Then, reading of data D16 to D512 in the user data section 3 is started in accordance with the resync pattern detection signal RSS and those data are stored in the buffer memory. The dummy data D1 to D15 of "00h" stored in the buffer memory are restored through an error correction process after reading of the sector is finished and the dummy data is replaced with the restored data in the buffer memory.

As shown in FIG. 2, the data reproducing apparatus includes a signal processing unit 100 which performs the above-described data reproducing process and a buffer memory 13. The signal processing unit 100 includes an MPU interface unit 5, an internal processor 6, a disk interface 7, a host interface 8, an error correcting operation unit 9 and a data transfer control circuit 10, which are mutually connected via an internal control bus 11, and a speed matching buffer 12 connected to the disk interface 7. The data transfer control circuit 10 includes an error correcting circuit 14, a data transfer circuit 15 and a memory controller 16.

The MPU interface unit 5 mutually transfers control signals with an MPU in a system control unit (not shown). The internal processor 6 performs the general control of the signal processing unit 100 in accordance with firmware stored in a program ROM 6a.

At the time of data reproduction, the disk interface 7 receives read data DR of an optical disk from a drive head (not shown) and discriminates based on data in the ID section 1 of each sector whether a target sector has been read. In a case where the target sector has been read, the disk interface 7 reads data in the user data section 3 using the sync patterns SB1 to SB3 and the resync patterns RS1 to RS39 in the data section 2 and supplies the data to the speed matching buffer 12 and the error correcting operation unit 9.

The disk interface 7 detects if each of the sync patterns SB1 to SB3 has been read. In a case where the sync patterns have not been detected (in a case where reading of the sync patterns has failed), the disk interface 7 supplies the sync miss detection signal SMS to the data transfer control circuit 10 and stops supplying data to the speed matching buffer 12 until the resync pattern RS1 is detected next.

At the time of writing data, the disk interface 7 supplies write data Dw to the drive head.

The speed matching buffer 12 is preferably an FIFO (First-In-First-Out) memory and supplies data supplied from the disk interface 7 to the data transfer control circuit 10 in a byte-by-byte manner at the time of data reproduction. At the time of writing data, the speed matching buffer 12 supplies write data supplied from the data transfer control circuit 10 to the disk interface 7.

At the time of data reproduction, the data transfer control circuit 10 stores data supplied from the speed matching buffer 12 in the buffer memory 13. In response to the sync miss detection signal SMS, the data transfer control circuit 10 generates dummy data corresponding to user data between the sync patterns SB1 to SB3 and the resync pattern RS1 and stores the dummy data in the buffer memory 13.

At the time of data reproduction, the error correcting operation unit 9 receives the read data DR from the disk interface 7 and performs an operation using one sector of user data, the error checking code and error correcting code to generate error position data EP and error quantity data EQ. Error correction is a known scheme disclosed in, for example, Japanese Laid-Open Patent Publication No. 8-137624.

The data transfer control circuit 10 receives the error position data EP and error quantity data EQ from the error correcting operation unit 9, generates reproduced data by performing error correction on one sector of read data stored in the buffer memory 13 and rewrites corresponding data stored in the buffer memory 13 with the reproduced data. The reproduced data is read from the buffer memory 13 and is supplied to an external unit via the data transfer control circuit 10 and the host interface 8.

The error correcting circuit 14 includes an EOR circuit 17 and a register 18. The register 18 receives the error position data EP from the error correcting operation unit 9 after reading of each sector data is finished and supplies the error position data EP to the buffer memory 13 as an address signal ADR1 via the memory controller 16. The EOR circuit 17 receives data DTi read from the buffer memory 13 according to the address signal ADR1 and the error quantity data EQ supplied from the error correcting operation unit 9, and performs an EOR operation on the data DTi and the error quantity data EQ. The EOR circuit 17 supplies EOR operation data DTo which is error-corrected data to the associated address of the buffer memory 13. Data stored in the buffer memory 13 is rewritten with error-corrected data in this manner.

The data transfer circuit 15 includes a sequencer 19, a counter 21, a dummy data generating circuit 22, a first selector 23, a second selector 20, a first address holding circuit 24, a register 25 and an adder 26.

The sequencer 19 supplies a control signal SG2 to the second selector 20 based on read position information supplied from the disk interface 7 and supplies a count start signal CT to the counter 21 in response to the sync miss detection signal SMS.

The counter 21 starts a counting operation in response to the count start signal CT and supplies a count signal SG1 to the dummy data generating circuit 22 and the first selector 23.

Dummy data Dd or "00h" is supplied to the first selector 23 from the dummy data generating circuit 22 and the read data DR is also supplied to the first selector 23 from the speed matching buffer 12. The first selector 23 outputs the dummy data Dd in response to the count signal SG1 and outputs the read data DR when the count signal SG1 is not supplied.

The first address holding circuit 24 receives an address from the internal processor 6, holds the address and supplies the held address to the second selector 20. The address is for storing the data D1 immediately after the sync patterns SB1 to SB3 in the data section 2 in the buffer memory 13.

The second selector 20 first selects an output signal S1 from the first address holding circuit 24 based on the sync miss detection signal SMS, then selects an output signal S2 from the adder 26 as shown in FIG. 4.

The output signal of the second selector 20 is supplied as an address signal ADR2 to the buffer memory 13 via the register 25 and the memory controller 16. The address signal ADR2 is for storing the read data DR or the dummy data Dd in the buffer memory 13.

The address signal ADR2 output from the register 25 is supplied to the adder 26. The adder 26 adds "1" to an address value of the address signal ADR2 and supplies the resultant address to the second selector 20.

In a case where the sync patterns SB1 to SB3 are properly read at the time of reading the data section 2, the error correcting circuit 14 and the data transfer circuit 15 write the read data DR in the buffer memory 13 using the header address held in the first address holding circuit 24. In a case where the sync miss detection signal SMS is supplied, the dummy data Dd is stored in the buffer memory 13 using the header address held by the first address holding circuit 24. Next, when the resync pattern RS1 is read, the read data DR is stored in the buffer memory 13.

When reading of one sector is finished, data is read from the buffer memory 13 based on the error position data EP, and the read data is subjected to error correction by the error correcting circuit 14, so that data stored in the buffer memory 13 is rewritten with the error-corrected data.

For data recording/reproducing apparatuses that perform an operation of writing data onto a recording medium using a laser, a scheme has been proposed which changes the write start position in the data section 2 at random in order to suppress fatigue of the recording medium caused by the repetitive writing operation to the recording medium.

Because the write positions for the sync patterns SB1 to SB3 and the resync patterns RS1 to RS39 change at random in this scheme, it is necessary to make the time widths Tw1 and Tw2 of the detection window setting signals ws1 and ws2 long in order to read the sync patterns SB1 to SB3 and the resync patterns RS1 to RS39. In this case, it is desirable that the time widths Tw1 and Tw2 should be made long to such a length that the detection window setting signals ws1 and ws2 overlap each other. It is however necessary to finish writing of dummy data in the buffer memory before the detection window setting signal ws2 goes to a high level after the detection window setting signal ws1 falls to a low level. It is not therefore possible to make the time widths Tw1 and Tw2 of the detection window setting signals ws1 and ws2 sufficiently long. This makes it impossible to adequately cope with a change in the write start position in the data section 2.

SUMMARY OF THE INVENTION

In a first aspect of the present invention, a method is provided to reproduce data by performing error correction on data which is read from a recording medium. A sync pattern is recorded before the data. The method includes the steps of reading the sync pattern, checking if the sync pattern has been read, recovering data following the sync pattern when the sync pattern has not been read, and performing the error correction on the recovered data. The data following the sync pattern is recovered in the error correction.

In a second aspect of the present invention, a method is provided to reproduce data by performing error correction on data which is read from a recording medium in units of sectors. A sync pattern is recorded before the data. The method includes the steps of reading the sync pattern, checking if the sync pattern has been read, generating dummy data corresponding to data following the sync pattern after reading one sector of data is finished when the sync pattern has not been read, and performing the error correction on the dummy data.

In a third aspect of the present invention, a method is provided to reproduce data by performing error correction on data including first data and second data read from a recording medium using a buffer memory. A sync pattern, the first data, a resync pattern and the second data are recorded on the recording medium in that order. The method includes the steps of transferring the first and second data read from the recording medium to the buffer memory based on the sync pattern and the resync pattern. The second data is only transferred to the buffer memory when the sync pattern has not been read. The error correction is performed on the first and second data. The first data is recovered in the error correction when the sync pattern has not been read.

In a fourth aspect of the present invention, a method is provided to reproduce data by performing error correction on data including first data and second data read in units of sectors from a recording medium using a buffer memory. A sync pattern, the first data, a resync pattern and the second data are recorded on the recording medium in that order. The first and second data read from the recording medium are transferred to the buffer memory based on the sync pattern and the resync pattern. The dummy data corresponding to the first data is transferred to the buffer memory after one sector of data is read when the sync pattern has not been read. The error correction is performed on the first and second data. The error correction is performed on the dummy data when the sync pattern has not been read.

In a fifth aspect of the present invention, a data reproducing apparatus connected to a buffer memory is provided to reproduce data by performing error correction on data including first data and second data read from a recording medium. A sync pattern, the first data, a resync pattern and the second data are recorded on the recording medium in that order. The apparatus includes a data transfer circuit which transfers the first and second data read from the recording medium to the buffer memory based on the sync pattern and the resync pattern. The data transfer circuit transfers only the second data to the buffer memory in response to a sync miss detection signal indicating that the sync pattern has not been read. An error correcting circuit receives the first and second data from the buffer memory and performs the error correction on the first and second data. The error correcting circuit recovers the first data in the error correction in response to the sync miss detection signal.

In a sixth aspect of the present invention, a data reproducing apparatus connected to a buffer memory is provided to reproduce data by performing error correction on data including first data and second data read in units of sectors from a recording medium. A sync pattern, the first data, a resync pattern and the second data are recorded on the recording medium in that order. The apparatus includes a data transfer circuit which transfers the first and second data read from the recording medium to the buffer memory based on the sync pattern and the resync pattern. The data transfer circuit transfers dummy data corresponding to the first data to the buffer memory, after one sector of data is read, in response to a sync miss detection signal indicating that the sync pattern has not been read. An error correcting circuit receives the first and second data from the buffer memory and performs the error correction on the first and second data. The error correcting circuit performs the error correction on the dummy data stored in the buffer memory.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE PREFERRED EMBODIMENTS

Figure 1:
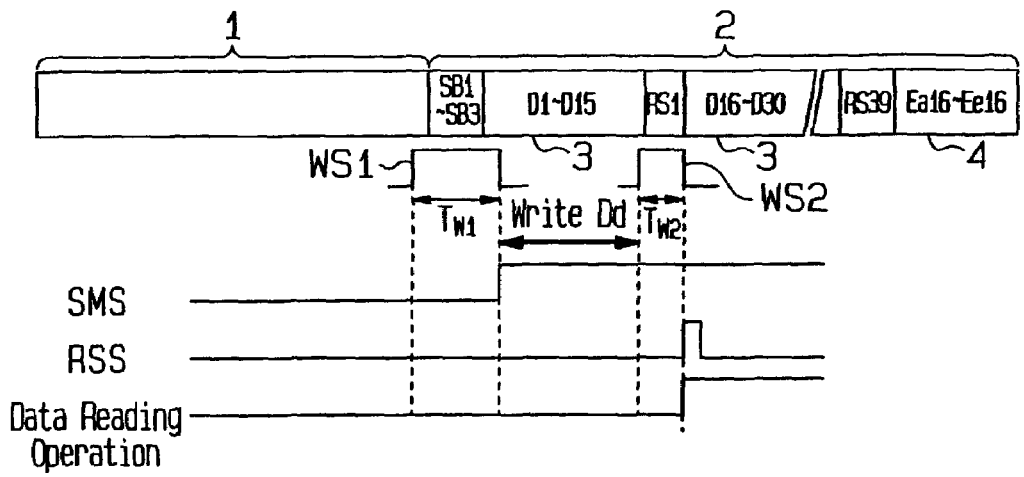
FIG. 1 is a diagram showing the structure of a conventional data sector.
Figure 2:
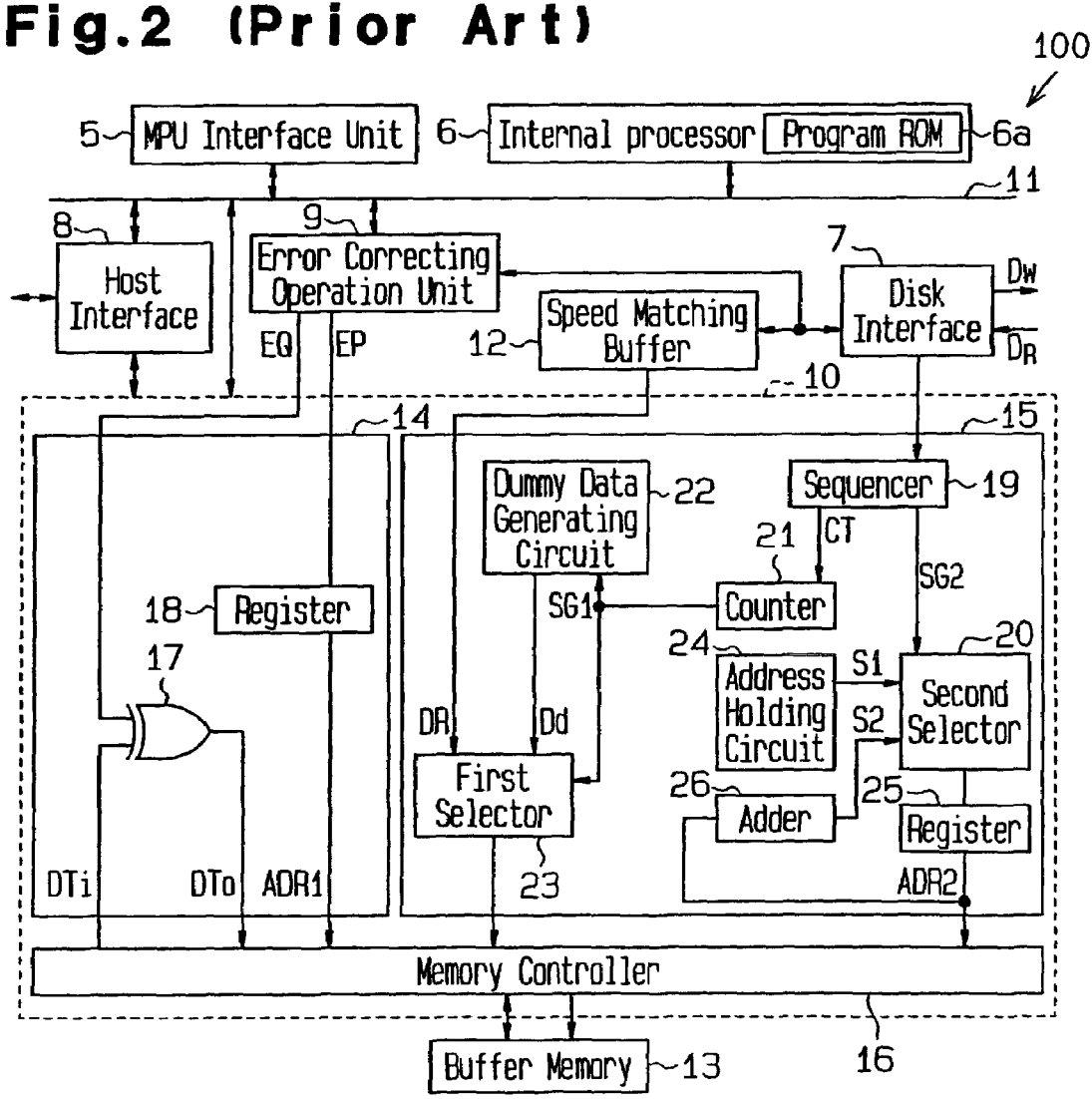
FIG. 2 is a schematic block diagram of a signal processing unit in a conventional data reproducing apparatus.

In the drawings, like numerals are used for like elements throughout.

Figure 3:
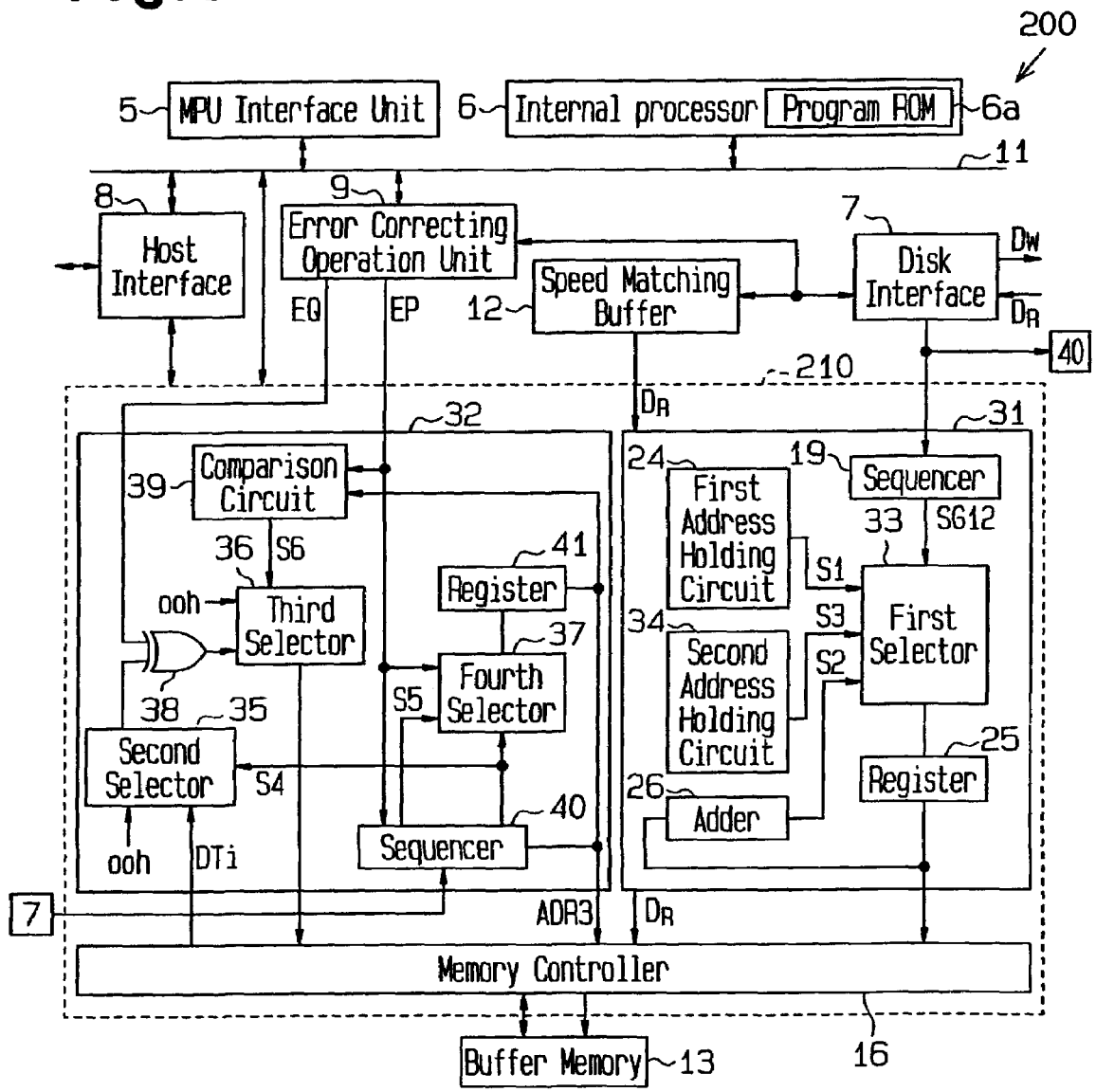
FIG. 3 is a schematic block diagram of a signal processing unit in a data reproducing apparatus according to a first embodiment of the present invention.

As shown in FIG. 3, a data recording/reproducing apparatus according to a first embodiment of the present invention includes a signal processing unit 200 and a buffer memory 13. The signal processing unit 200 includes an MPU interface unit 5, an internal processor 6, a disk interface 7, a host interface 8, an error correcting operation unit 9 and a data transfer control circuit 210, which are connected to one another via an internal control bus 11, and a speed matching buffer 12 connected to the disk interface 7. The data transfer control circuit 210 includes a data transfer circuit 31 and an error correcting circuit 32.

The data transfer circuit 31 receives read data DR supplied from the speed matching buffer 12 and supplies the read data DR to the memory controller 16. The data transfer circuit 31 includes a sequencer 19, a register 25, an adder 26, a first address holding circuit 24, a second address holding circuit 34 and a first selector 33.

The first selector 33 is supplied with an output signal S1 from the first address holding circuit 24, an output signal S3 from the second address holding circuit 34 and an output signal S2 from the adder 26.

The second address holding circuit 34 holds a header address for storing data, which is read following a resync pattern RS1, in the buffer memory 13.

Figure 4:
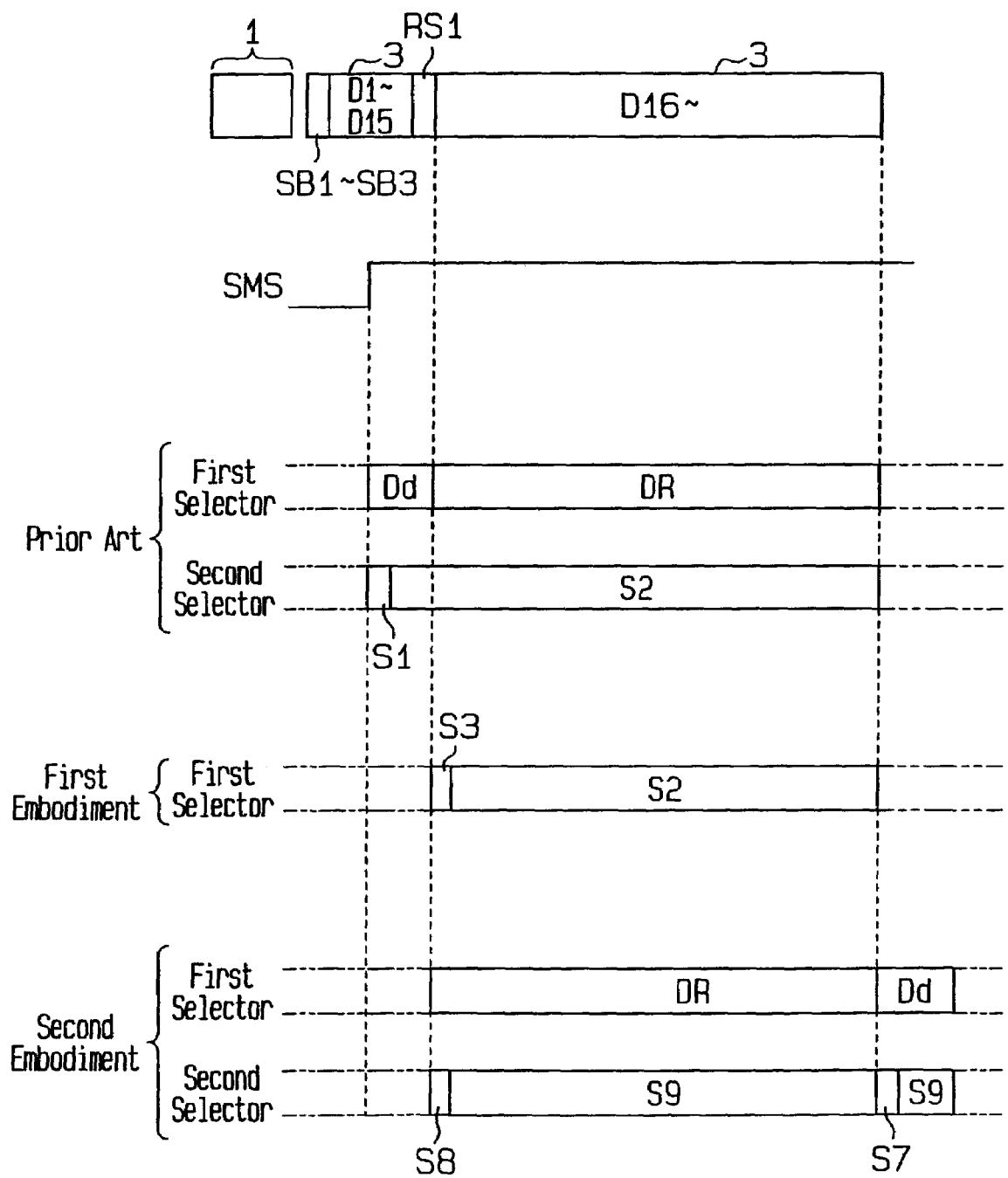
FIG. 4 is a diagram for explaining the operation of the signal processing unit of FIG. 3.

As shown in FIG. 4, a sync miss detection signal SMS which indicates that sync patterns SB1 to SB3 could not be detected is supplied to the data transfer control circuit 210. When the resync pattern RS1 is read next, the first selector 33 selects the output signal S3 from the second address holding circuit 34 according to a control signal S12 and selects the output signal S2 from the adder 26 thereafter. That is, when the sync miss detection signal SMS is supplied to the data transfer control circuit 210, the read data DR read following the resync pattern RS1 is stored in the buffer memory 13.

In a case where the sync patterns SB1 to SB3 are properly read, the first selector 33 selects the output signal S1 of the first address holding circuit 24 in accordance with the control signal S12 and selects the output signal S2 of the adder 26 thereafter. That is, in a case where the sync patterns SB1 to SB3 are properly detected, read data D1 to D15 following the sync patterns SB1 to SB3 are stored in the buffer memory 13.

The error correcting circuit 32 includes three selectors 35 to 37, an EOR circuit 38, a comparison circuit 39, a sequencer 40 and a register 41.

The sequencer 40 receives error position data EP from the error correcting operation unit 9, and supplies a control signal S4 to the second and fourth selectors 35 and 37 based on the error position data EP. Further, the sequencer 40 generates an address in the buffer memory 13 for storing the data D1 to D15 between the sync patterns SB1 to SB3 and the resync pattern RS1 in response to the sync miss detection signal SMS and supplies an address output signal S5 to the fourth selector 37. The error position data EP is supplied to the fourth selector 37 from the error correcting operation unit 9.

The fourth selector 37 selects the address output signal S5 based on the control signal S4 when the sync miss detection signal SMS is supplied to the data transfer control circuit 210, and selects the error position data EP when the sync miss detection signal SMS is not supplied. The signal selected by the fourth selector 37 is supplied as an address signal ADR3 to the buffer memory 13 via the register 41 and the memory controller 16, and is supplied to the sequencer 40 via the register 41.

The comparison circuit 39 receives the selected signal from the fourth selector 37 supplied from the register 41 and the error position data EP supplied from the error correcting operation unit 9, compares the selected signal with the error position data EP and supplies a control signal S6 to the third selector 36.

The second selector 35 receives read data DTi read from the buffer memory 13 and data "00h" generated in the error correcting circuit 32, and selects the data "00h" according to the control signal S4 while the sequencer 40 is outputting the address output signal S5. The second selector 35 selects the read data DTi except while the address output signal S5 is output.

The EOR circuit 38 receives error quantity data EQ supplied from the error correcting operation unit 9 and selected data supplied from the second selector 35 and performs an EOR operation on the selected data and the error quantity data EQ.

The third selector 36 receives an EOR logic output signal supplied from the EOR circuit 38 and the data "00h" generated in the error correcting circuit 32, and selects the data "00h" based on the control signal S6 when the following three conditions are all met.

(1) The address output from the register 41 coincides with the address for storing the read data D1 to D15;

(2) The address output from the register 41 does not coincide with the error position data EP; and (3) The data recording/reproducing apparatus has failed to read the sync patterns SB1 to SB3.

Next, the operations of the data transfer circuit 31 and the error correcting circuit 32 will be described below.

At the time of storing the read data DR from a recording medium in the buffer memory 13, when the data recording/reproducing apparatus fails to read the sync patterns SB1 to SB3, the disk interface 7 supplies the sync miss detection signal SMS to the data transfer control circuit 210.

As shown in FIG. 4, the first selector 33 of the data transfer circuit 31 selects the address held by the second address holding circuit 34 first, and then selects the output signal S2 from the adder 26. Even if the sync miss detection signal SMS is generated, therefore, dummy data is not written in the buffer memory 13 and the read data DR following the resync pattern RS1 is stored in the buffer memory 13.

When reading one sector is finished, an error correction process is performed. The error correcting operation unit 9 performs an operation using the data "00h" instead of the data D1 to D15 between the sync patterns SB1 to SB3 which could not be read and the resync pattern RS1. That is, when reading of the sync patterns SB1 to SB3 has failed, the data D1 to D15 is recovered by the data "00h".

The sequencer 40 in the error correcting circuit 32 supplies the address output signal S5 for the data D1 to D15 to the fourth selector 37 in response to the sync miss detection signal SMS. The fourth selector 37 selects the address output signal S5 according to the control signal S4 and supplies the address output signal S5 to the register 41. Therefore, the address for storing the data D1 to D15 is selected in the buffer memory 13.

The second selector 35 selects the data "00h" according to the control signal S4 and supplies the data "00h" to the EOR circuit 38. The EOR circuit 38 supplies the third selector 36 with an EOR output signal obtained from an EOR operation on the error quantity data EQ supplied from the error correcting operation unit 9 and the data "00h".

The third selector 36 selects the output signal (error-corrected data) from the EOR circuit 38 based on the control signal S6 when the address supplied from the register 41 coincides with the error position data EP, and supplies the error-corrected data to the buffer memory 13. When the address output from the register 41 does not coincide with the error position data EP, the third selector 36 selects the data "00h" based on the control signal S6.

That is, when reading of the data D1 to D15 between the sync patterns SB1 to SB3 and the resync pattern RS1 has failed, the error correcting operation unit 9 performs an operation using the data "00h" corresponding to the data D1 to D15. In a case where the error position data EP differs from the address for the data D1 to D15, the third selector 36 selects the data "00h" regarded as correct data and stores the data "00h" in the buffer memory 13.

In a case where the error position data EP matches with the address for the data D1 to D15, the data "00h" is regarded as being in error and the EOR output signal of the data "00h" and the error quantity data EQ is stored in the buffer memory 13. The data D1 to D15 which have not been read is subject to error correction and stored in the buffer memory 13. When the error correction is finished, the fourth selector 37 selects the error position data EP according to the control signal S4 supplied from the sequencer 40 and supplies the error position data EP to the register 41. The second selector 35 selects the read data DTi from the buffer memory 13 according to the control signal S4 and supplies the read data DTi to the EOR circuit 38. The data at the address corresponding to the error position data EP is read from the buffer memory 13 and supplied to the EOR circuit 38. The third selector 36 selects the EOR logic output signal from the EOR circuit 38 in response to the control signal S6 based on the error position data EP, so that the error-corrected data is written back in the buffer memory 13. The normal error correction is performed this way.

The signal processing unit 200 of the data recording/reproducing apparatus according to the first embodiment has the following advantages.

(1) When reading of the sync patterns SB1 to SB3 has failed and the sync miss detection signal SMS is generated, dummy data is not written in the buffer memory 13 while the resync pattern RS1 is read. This makes it easier to lengthen the time widths Tw1 and Tw2 of the detection window setting signals ws1 and ws2.

(2) The data D1 to D15 between the sync patterns SB1 to SB3 whose reading has failed and the resync pattern RS1 is recovered in the error correction which is performed after reading of one sector is finished. During this time, dummy data is not written in the buffer memory 13. Error correction is performed in parallel to the operation of reading the next sector. Therefore, the data reading speed does not fall.

(3) Since the time widths Tw1 and Tw2 of the detection window setting signals ws1 and ws2 become longer, it is possible to sufficiently cope with a change in the write start position in the data section 2.

Figure 5:
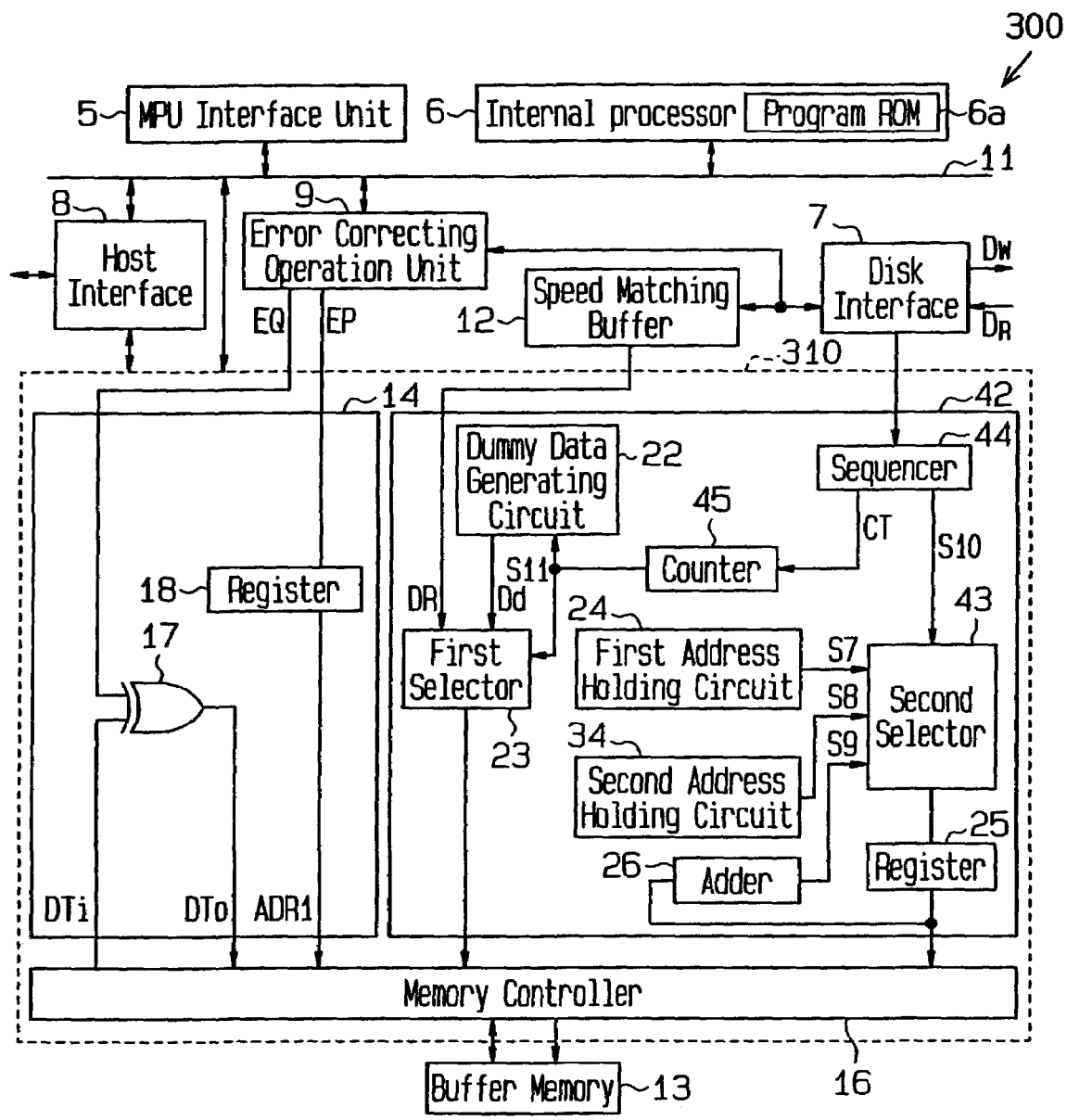
FIG. 5 is a schematic block diagram of a signal processing unit according to a second embodiment of the present invention.

As shown in FIG. 5, a signal processing unit 300 according to a second embodiment of the present invention includes a data transfer circuit 42. The data transfer circuit 42 includes a dummy data generating circuit 22, a first selector 23, a second selector 43, a register 25, an adder 26, a first address holding circuit 24, a second address holding circuit 34, a sequencer 44 and a counter 45.

The dummy data generating circuit 22 and the first selector 23 are the same as those of the prior art. The first address holding circuit 24, the second address holding circuit 34 and the adder 26 are the same as those of the first embodiment, and respectively supply output signals S7, S8 and S9 to the second selector 43. The selected output signal from the second selector 43 is supplied to the buffer memory 13 via the register 25.

The sequencer 44 supplies a control signal S10 to the second selector 43 and supplies a count signal CT to the counter 45 based on read position information and the sync miss detection signal SMS supplied from the disk interface 7. The counter 45 starts a counting operation in response to the count signal CT and supplies a control signal S11 to the dummy data generating circuit 22 and the first selector 23 at the time of the counting operation.

The operations of the data transfer circuit 42 and the error correcting circuit 14 will be discussed below.

At the time of storing read data DR from a recording medium in the buffer memory 13, when reading of the sync patterns SB1 to SB3 has failed, the sync miss detection signal SMS is supplied to the data transfer control circuit 310.

As shown in FIG. 4, the second selector 43 selects the address held by the second address holding circuit 34 according to the control signal S10 supplied from the sequencer 44 and then selects the output signal S9 from the adder 26.

Because the control signal S11 has not been supplied to the first selector 23 at this time, the first selector 23 selects the output signal from the speed matching buffer 12. Through such an operation, even when the sync miss detection signal SMS is supplied, writing of dummy data in the buffer memory 13 is not performed immediately and the read data DR following the resync pattern RS1 is stored in the buffer memory 13.

When reading of one sector is finished, the second selector 43 selects the output signal S7 from the first address holding circuit 24 according to the control signal S10 supplied from the sequence 44 and selects the output signal S9 from the adder 26.

The counter 45 starts a counting operation in response to the count signal CT supplied from the sequencer 44 and supplies the control signal S11 to the dummy data generating circuit 22 and the first selector 23. The dummy data generating circuit 22 generates dummy data Dd in response to the control signal S11 and supplies the dummy data Dd to the first selector 23. The first selector 23 selects the dummy data Dd and supplies the dummy data Dd to the buffer memory 13. This operation allows the dummy data Dd to be stored at the address in the buffer memory 13 where the data D1 to D15 between the sync patterns SB1 to SB3 and the resync pattern RS1 are to be stored. When the dummy data Dd equal to the quantity of data between the sync patterns SB1 to SB3 and the resync pattern RS1 is stored, outputting of the control signal S11 from the counter 45 is stopped and writing of the dummy data Dd is terminated. Thereafter, error correction is performed by the error correcting operation unit 9 and the error correcting circuit 14.

In a case where the sync patterns SB1 to SB3 have been read properly, the second selector 43 selects the output signal S7 from the first address holding circuit 24 according to the control signal S10, and selects the output signal S9 from the adder 26. The first selector 23 selects the read data DR supplied from the speed matching buffer 12 and supplies the read data DR to the buffer memory 13. The read data DR is thus stored at a predetermined address in the buffer memory 13. After reading of one sector is finished, the error correcting operation unit 9 and the error correcting circuit 14 perform error correction on the read data DR stored in the buffer memory 13.

The signal processing unit 300 according to the second embodiment has the following advantages.

(1) In a case where reading of the sync patterns SB1 to SB3 has failed and the sync miss detection signal SMS is generated, dummy data Dd is not written in the buffer memory 13 while the resync pattern RS1 is read. This makes it easier to lengthen the time widths Tw1 and Tw2 of the detection window setting signals ws1 and ws2.

(2) The data D1 to D15 between the sync patterns SB1 to SB3 and the resync pattern RS1 whose reading has failed is written as the dummy data Dd in the buffer memory 13 after reading of one sector is finished. Since the quantity of the dummy data Dd is relatively small, writing of the dummy data is certainly finished before reading of the next sector starts. The data D1 to D15 is reproduced through error correction after reading of one sector is finished. Therefore, the data reading speed does not fall.

(3) Since the time widths Tw1 and Tw2 of the detection window setting signals ws1 and ws2 become longer, it is possible to sufficiently cope with a change in the write start position in the data section 2.

It should be apparent to those skilled in the art that the present invention may be embodied in many other specific forms without departing from the spirit or scope of the invention. Particularly, it should be understood that the invention may be embodied in the following forms.

In each embodiment, an address in the data transfer circuit or the error correcting circuit may be generated by firmware based on the operation of the internal processor.

Therefore, the present examples and embodiments are to be considered as illustrative and not restrictive and the invention is not to be limited to the details given herein, but may be modified within the scope and equivalence of the appended claims.

What is claimed is:

1. A method of performing error correction on data which is read from a recording medium using an error correcting circuit, wherein a sync pattern is recorded before the data, the method comprising the steps of:

checking if the sync pattern has been read;

generating data 00h in the error correcting circuit when the sync pattern has not been read;

computing error quantity data and error position data using the data 00h when the sync pattern has not been read;

selecting the error quantity data as error corrected data when the error position data indicates a position of the data following the sync pattern; and selecting the 00h as error corrected data when the error position data does not indicate the position of the data following the sync pattern.

2. The method according to claim 1, wherein data read from the recording medium is stored in a buffer memory, and the method further comprises the steps of:

stopping storage of data following the sync pattern at a predetermined address of the buffer memory when the sync pattern has not been read; and storing the error corrected data at the predetermined address of the buffer memory.

* * * * *

UNITED STATES PATENT AND TRADEMARK OFFICE
CERTIFICATE OF CORRECTION

PATENT NO. : 7,269,779 B2
APPLICATION NO. : 10/366525
DATED : September 11, 2007
INVENTOR(S) : Yasuyuki Watanabe Page 1 of 1

It is certified that error appears in the above-identified patent and that said Letters Patent is hereby corrected as shown below:

Column 10, Line 52 (Claim 1, Line 14), before "00H" insert --data--.

Signed and Sealed this

First Day of April, 2008

JON W. DUDAS
*Director of the United States Patent and Trademark Office*